US006315545B1

(12) United States Patent
Inoue

(10) Patent No.: US 6,315,545 B1
(45) Date of Patent: Nov. 13, 2001

(54) DIE FOR EXTRUDING CERAMIC HONEYCOMB STRUCTURAL BODIES

(75) Inventor: Satoru Inoue, Hazu-Gun (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/382,148

(22) Filed: Aug. 24, 1999

(30) Foreign Application Priority Data

Sep. 2, 1998 (JP) .................................................. 10-248082

(51) Int. Cl.[7] .................................................. B29C 47/12

(52) U.S. Cl. .................................. 425/192 R; 425/382 R; 425/463; 425/467; 264/177.12

(58) Field of Search ................................ 425/192 R, 380, 425/382 R, 463, 464, 467; 264/177.12

(56) References Cited

U.S. PATENT DOCUMENTS

| | | | | |
|---|---|---|---|---|
| 4,445,838 | * | 5/1984 | Groff | 425/319 |
| 4,687,433 | * | 8/1987 | Ozaki et al. | 425/464 |
| 4,834,640 | * | 5/1989 | Inoue et al. | 425/464 |
| 5,013,232 | * | 5/1991 | Way | 425/192 R |
| 5,487,863 | * | 1/1996 | Cunningham et al. | 264/177.11 |

* cited by examiner

*Primary Examiner*—Nam Nguyen
*Assistant Examiner*—Donald Heckenberg
(74) *Attorney, Agent, or Firm*—Parkhurst & Wendel, L.L.P.

(57) ABSTRACT

A die for extruding ceramic honeycomb structural bodies, have a plurality of ceramic batch discharge slits, a plurality of ceramic batch supply holes communicated with the ceramic batch discharge slits, and a plurality of pipes fitted into at least some of the ceramic batch holes. In the die, the pipes are inserted into the ceramic batch supply holes in such a manner that tip portions of the pipes are located apart from bottom portions of the ceramic batch supply holes.

11 Claims, 4 Drawing Sheets

DIE FOR EXTRUDING CERAMIC HONEYCOMB STRUCTURAL BODIES

BACKGROUND OF THE INVENTION

1. Field of the Invention

The present invention relates to a die for extruding ceramic honeycomb structural bodies having a plurality of through holes defined by partition walls.

2. Description of Related Art

Generally, as a catalyst carrier and a particulate purifying filter, both used for purifying an exhaust gas from internal combustion engines, or, as a filter used for purifying/deoxidizing a combustion gas of oil or various gases, ceramic honeycomb structural bodies are used. Especially, as a ceramic honeycomb structural body used for the catalyst carrier for purifying an exhaust gas from the internal combustion engines, in order to achieve an improvement of exhaust gas purifying efficiency, a decrease of pressure loss, and a use under high temperatures, it is required to have more thinner partition walls and more larger number of through holes.

To meet the requirements mentioned above, when the ceramic honeycomb structural bodies having more thinner partition wall is to be formed by an extrusion forming method using a die, it is necessary to decrease sizes of slit widths of ceramic batch discharge slits and sizes of hole diameters of ceramic batch supply holes in response to a thinner wall to be required. In this case, there is a drawback such that a die manufacturing becomes extremely difficult and thus larger manufacturing steps are required. Moreover, there are drawbacks on working precision, cost, and time of delivery.

In order to eliminate the drawbacks mentioned above, the applicant proposed a die for extruding ceramic honeycomb structural bodies in U.S. Pat. No. 4,687,433 (Japanese Patent Publication No. 64-7843:JP-B-64-7843). FIG. 5 is a schematic view showing one embodiment of the die for extruding ceramic honeycomb structural bodies disclosed in U.S. Pat. No. 4,687,433. In FIG. 5, a known die 51 for extruding ceramic honeycomb structural bodies comprises a plurality of ceramic batch discharge slits 54 and a plurality of ceramic batch supply holes 52. In the die 51, a plurality of pipes 53 are fitted into at least some of the ceramic batch supply holes 52.

In the die 51 having the construction mentioned above, there is a merit such that an extrusion die for extruding ceramic honeycomb structural bodies having thin walls can be manufactured easily without using a special working means. However, in the die 51 having the construction mentioned above, as shown in FIG. 5, a tip portion 53*a* of the pipe 53 is inserted into the ceramic batch supply hole 52 to its bottom portion 52*a*.

Therefore, there is the tip portion 53*a* of the pipe 53 all around a portion d of the ceramic batch discharge slit 54 in its tip portion 54*a*. As a result, a ceramic batch to be extruded, which is supplied via the ceramic supply hole 52, is supplied into the ceramic batch discharge slit 54 only through a portion e in the tip portion 54*a* of the ceramic batch discharge slit 54. In this case, if the ceramic batch discharge slit 54 is arranged by deeply cutting, there is a drawback that only a part of the deep ceramic batch discharge slit 54 is used for a ceramic batch discharge. Moreover, if only a part of the ceramic batch discharge slit 54 is used for a ceramic discharge, it is difficult to discharge uniformly a ceramic batch from the ceramic batch discharge slit 54. In this case, a thickness of the wall after extruding is not uniform, the ceramic honeycomb structural body after extruding is deformed, and, in an extreme case, the ceramic honeycomb structural body can not be extruded.

SUMMARY OF THE INVENTION

An object of the invention is to eliminate the drawbacks mentioned above and to provide a die for extruding ceramic honeycomb structural bodies which can eliminate the drawbacks of pipes when ceramic batch supply holes are formed by using the pipes and which can extrude the ceramic honeycomb structural bodies having excellent properties.

According to the invention, a die for extruding ceramic honeycomb structural bodies, comprises a plurality of ceramic batch discharge slits, a plurality of ceramic batch supply holes communicated with said ceramic batch discharge slits, and a plurality of pipes fitted into at least some of said ceramic batch holes, wherein said pipes are inserted into said ceramic batch supply holes in such a manner that tip portions of said pipes are located apart from bottom portions of said ceramic batch supply holes.

In the present invention, the pipes are inserted in such a manner that the tip portions of the pipes are located apart from the bottom portions of the ceramic batch supply holes, and, preferably, the locations of the tip portions of the pipes correspond to tip portions of the ceramic batch discharge slits. Therefore, it is possible to achieve a construction such that the tip portions of the pipes are not existent around at least a part of or all of the tip portions of the ceramic batch discharge slits, and a smooth ceramic batch supply from the ceramic batch supply holes to the ceramic batch discharge slits can be achieved, so that drawbacks of the pipes can be eliminated.

Moreover, in the case that the pipes are accommodated in pipe accommodation portions arranged to the ceramic batch supply holes, or that the pipes are arranged to inner surfaces of the ceramic batch supply holes and flanges are arranged integrally to projected end portions of the pipes, or that the pipes are fixed to the ceramic batch supply holes by using at least one support member, it is possible to prevent the movements of the pipes toward the bottom portions or the open end portions of the ceramic batch supply holes, and thus theses cases are preferred embodiments. Further, it is preferred to arrange surface coating portions to the ceramic batch discharge slits and the ceramic batch supply holes under such a condition that the pipes are inserted into the ceramic batch supply holes, and also it is preferred to arrange the surface coating portions to the ceramic batch discharge slits and the ceramic batch supply holes before the pipes are inserted into the ceramic batch supply holes. When the surface coating portions are arranged, it is possible to form an R (round) portion to the ceramic batch discharge slits, and thus it is a preferred embodiment for extruding the ceramic honeycomb structural bodies.

In the present invention, a phrase "a plurality of pipes are fitted into at least some of the ceramic batch supply holes" means not only the case such that the pipes are inserted into some of a plurality of ceramic batch supply holes but also the case such that the pipes are inserted into all of a plurality of ceramic batch supply holes.

DESCRIPTION OF THE PREFERRED EMBODIMENT

Figure 1A:
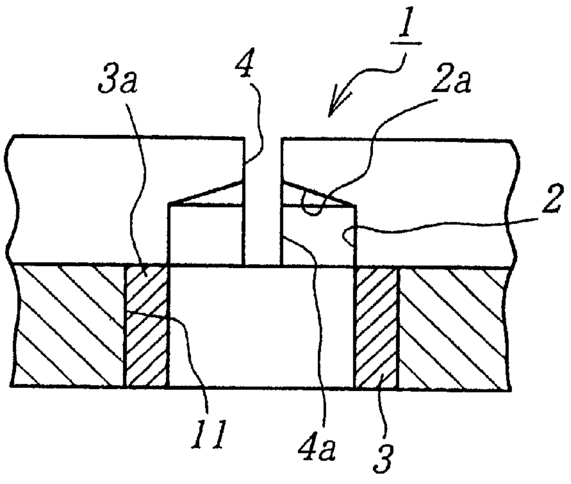
FIGS. 1*a* and 1*b* are schematic views respectively showing one embodiment of a die for extruding ceramic honeycomb structural bodies according to the invention.
Figure 1B:
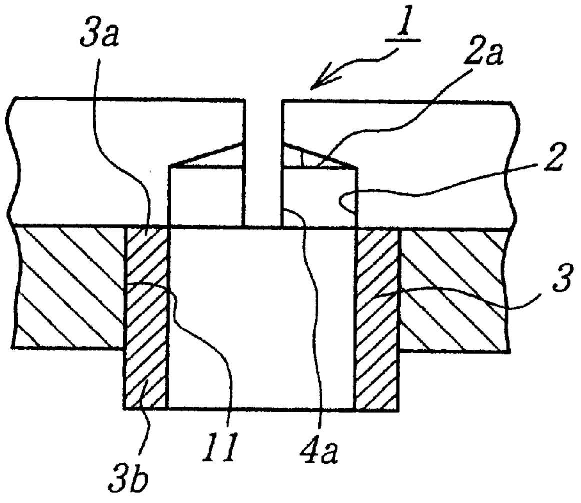

FIGS. 1*a* and 1*b* are schematic views respectively showing one embodiment of a die for extruding ceramic honeycomb structural bodies. In the embodiment shown in FIG. 1*a*, a die 1 for extruding ceramic honeycomb structural bodies according to the invention comprises a plurality of ceramic batch discharge slits 4, a plurality of ceramic batch supply holes 2 and a plurality of pipes 3 inserted into the ceramic batch supply holes 2. The pipes 3 may be arranged to all the ceramic batch supply holes 2 and may be arranged to a part of the ceramic batch supply holes 2. The feature of the present invention is to insert the pipes 3 into the ceramic batch supply holes 2 in such a manner that insert tip portions 3*a* of the pipes 3 are located apart from bottom portions 2*a* of the ceramic batch supply holes 2.

In the embodiment shown in FIG. 1*a*, as a preferred embodiment, locations of the insert tip portions 3*a* of the pipes 3 correspond to locations of slit tip portions 4*a* of the ceramic batch discharge slits 4. In the present invention, if only the pipes 3 are inserted into the ceramic batch supply holes 2 in such a manner that the insert tip portions 3*a* of the pipes 3 are located apart from the bottom portions 2*a* of the ceramic batch supply holes 2, it is possible to eliminate the drawback such that the insertion tip portions 3*a* of the pipes 3 cover the tip portions 4*a* of the ceramic batch discharge slits 4 and such ceramic discharge slits 4 do not contribute to a ceramic batch extrusion.

However, in the case that the insert tip portions 3*a* of the pipes 3 are located apart from the bottom portions 2*a* but near the bottom portions 2*a* of the ceramic batch supply holes 2 and that the insert tip portions 3*a* cover a part of the tip portions 4*a*, the effect of the present invention mentioned above is reduced. On the other hand, in the case that the insert tip portions 3*a* of the pipes 3 are located far away from the bottom portions 2*a* of the ceramic batch supply holes 2, the ceramic batch is contacted directly to inner surfaces of the ceramic batch supply holes 2. Generally, the inner surfaces of the ceramic batch supply holes 2 are not worked so precisely since the pipes 3 can only be inserted therein, and thus this case is not preferred. Therefore, as shown in FIG. 1*a*, it is most preferred that the locations of the insert tip portions 3*a* of the pipes 3 correspond to the tip portions 4*a* of the ceramic batch discharge slits 4.

Moreover, in the embodiment shown in FIG. 1*a*, when the pipes 3 are inserted into the ceramic batch supply holes 2, pipe accommodation portions 11 having diameters larger than those of the ceramic batch supply holes 2 are arranged to inner surfaces of the ceramic batch supply holes 2, and the pipes 3 are accommodated in the pipe accommodation portions 11. According to the construction mentioned above, since inner surfaces of the pipes 3 and inner surfaces of the ceramic batch supply holes 2 to which the pipes 3 are not existent are the same surfaces, a flow of the ceramic batch becomes smooth. Further, since the tip portions 3*a* of the pipes 3 are contacted to tip portions of the pipe accommodation portions 11, it is possible to prevent movements of the pipes 3 toward the bottom portions 2*a* of the ceramic batch supply holes 2.

As a material of the pipes 3, as is the same as the known one, use may be made of metals such as stainless steel, nickel, chrome steel and so on; steels on which nickel, chrome, Teflon and so on are coated; copper alloy; hard metals such as alumina and so on; and plastics. A choice of materials is determined according to factors such as material of the ceramic honeycomb structural bodies, ceramic batch, extruding pressure, resistivity distribution of the ceramic batch and so on, and generally wear resistivity and wear coefficients with respect to the ceramic batch are taking into consideration.

In the embodiment shown in FIG. 1*b*, as is the same as the embodiment shown in FIG. 1*a*, locations of the insertion tip portions 3*a* of the pipes 3 correspond to locations of the tip portions 4*a* of the ceramic batch discharge slits 4, and the pipes 3 are accommodated in the pipe accommodation portion 11 arranged to the inner surfaces of the ceramic batch supply holes 2. In the embodiment shown in FIG. 1*b*, a different point as that of FIG. 1*a* is that another tip portions opposed to the insert tip portions 3*a* of the pipes 3 are extended toward open ends of the ceramic batch supply holes 2, without being the same locations as those of the open ends of the ceramic batch supply holes 2 as shown in FIG. 1*a*, to form projection portions 3*b*. These projection portions 3*b* are effective for detaching the pipes 3 with respect to the ceramic batch supply holes 2.

Figure 2A:
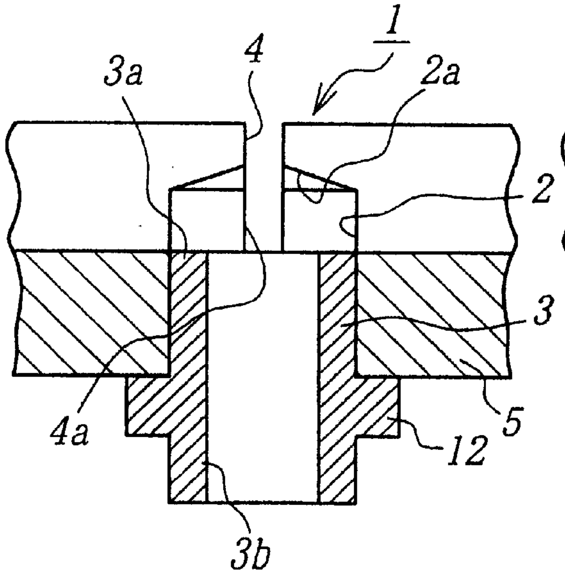
FIGS. 2*a* and 2*b* are schematic views respectively illustrating another embodiment of a die for extruding ceramic honeycomb structural bodies according to the invention.
Figure 2B:
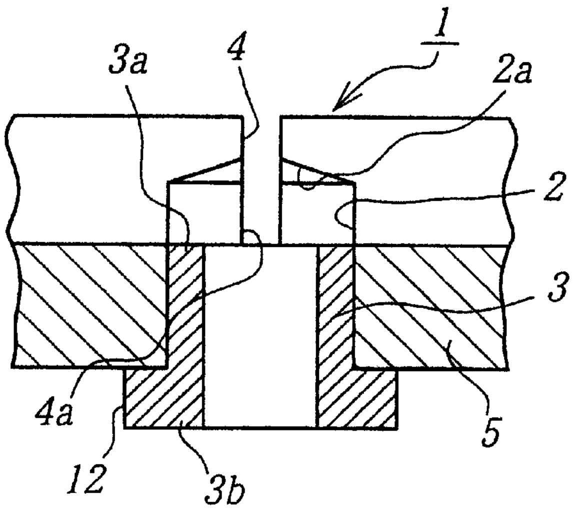

FIGS. 2*a* and 2*b* are schematic views respectively showing another embodiment of a die for extruding ceramic honeycomb structural bodies according to the invention. In the embodiments shown in FIGS. 2*a* and 2*b*, as is the same as the embodiments shown in FIGS. 1*a* and 1*b*, locations of the insert tip portions 3*a* of the pipes 3 correspond to locations of the tip portions 4*a* of the ceramic batch discharge slits 4. In the embodiment shown in FIGS. 2*a* and 2*b*, a different point as compared with FIGS. 1*a* and 1*b* is that the pipes 3 are directly arranged to inner surfaces of the ceramic batch supply holes 2. In the case that the pipes 3 are directly arranged to the inner surfaces of the ceramic batch supply holes 2, since the insertion tip portions 3*a* of the pipes 3 are exposed to the bottom portions 2*a* of the ceramic batch supply holes 2 and form steps, as compared with the case that the pipes 3 are accommodated in the pipe accommodation portions 11 as shown in FIGS. 1*a* and 1*b*, a flow of the ceramic batch is slightly affected. However, since it is not necessary to form the pipe accommodation portions 11, it is possible to produce the die 1 easily.

Moreover, features of the embodiments shown in FIGS. 2*a* and 2*b* are that flanges 12 are arranged to the projections portions 3*b* of the pipes 3 and the flanges 12 are fitted to die main body 5 to fix the pipes 3 to the ceramic batch supply holes 2, so that movements of the pipes 3 toward the bottom portions 2*a* of the ceramic batch supply holes 2 are prevented. A difference between the embodiment shown in FIG. 2*a* and the embodiment shown in FIG. 2*b* is as follows. In the embodiment shown in FIG. 2*a*, the projection portions 3*b* of the pipes 3 are further extended from the locations of the flanges 12. On the other hand, in the embodiment shown in FIG. 2*b*, the projection portions 3*b* of the pipes 3 are not further extended from the flanges 12 and then are located at the same level.

Figure 3A:
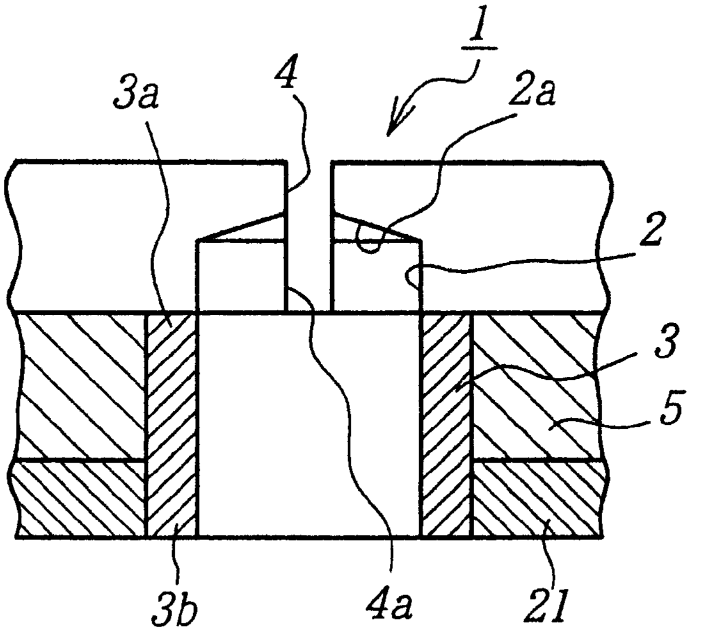
FIGS. 3*a* and 3*b* are schematic views respectively depicting still another embodiment of a die for extruding ceramic honeycomb structural bodies according to the invention.
Figure 3B:
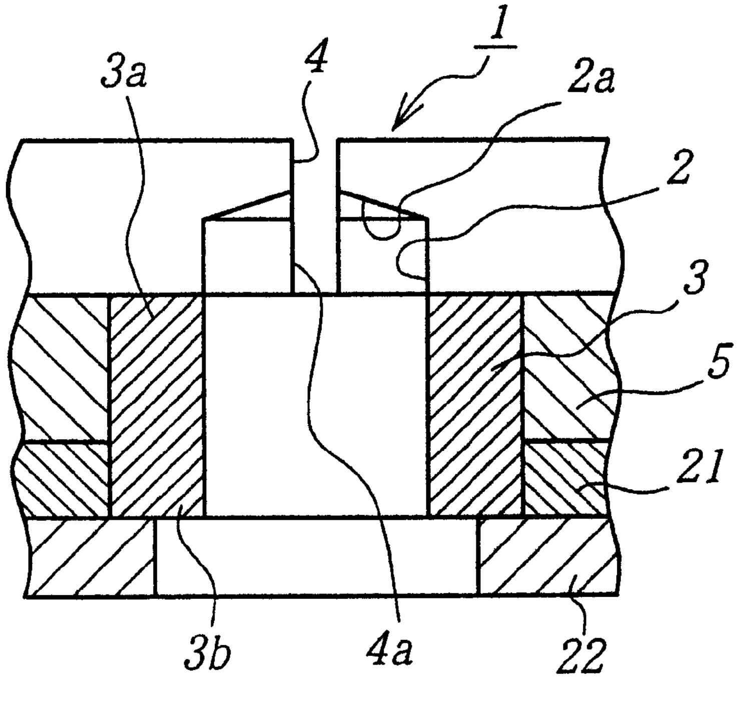

FIGS. 3*a* and 3*b* are schematic views respectively showing still another embodiment of a die for extruding ceramic honeycomb structural bodies according to the invention.

Also in the embodiments shown in FIGS. 3*a* and 3*b*, as is the same as the embodiments shown in FIGS. 1*a* and 1*b*, locations of the insert tip portions 3*a* of the pipes 3 correspond to locations of the tip portions 4*a* of the ceramic batch discharge slits 4, and the pipes 3 are accommodated in the pipe accommodation portions 11 arranged to inner surfaces of the ceramic batch supply holes 2. In the embodiments shown in FIGS. 3*a* and 3*b*, a different point as compared with the embodiments shown in FIGS. 1*a* and 1*b* is that first support members 21 are arranged to the projection portions 3*b* of the pipes 3 so as to make the projection portions 3*b* of the pipes 3 to a flat level. That is to say, in the embodiment shown in FIG. 3*a*, at the open end portions of the ceramic batch supply holes 2, the first support members 21 are arranged to the die main bodies 5, which are outside of the projection portions 3*b* of the pipes 3, and the projection portions 3*b* of the pipes 3 are made to the same level as compared with the open end portions of the ceramic batch supply holes 2.

Moreover, in the embodiment shown in FIG. 3*b*, in addition to the tip end flat step achieved by using the first support members 21, the projection portions 3*b* of the pipes 3 and the first support members 21 are fixed by second support members 22 so as to prevent dropping out of the pipes 3 and the first support members 21. Therefore, it is possible to perform a more firm fixing operation of the pipes 3 to the ceramic batch supply holes 2. That is to say, the projection portions 3*b* of the pipes 3 are made to a flat level as is the same as the open end portions of the ceramic batch supply holes 2 by using the first support members 21, and movements of the pipes 3 toward the open end portions of the ceramic batch supply holes 2 can be prevented by using the second support members 22.

In the embodiments mentioned above, two kinds of support members such as the first support member 21 and the second support member 22 are used, but it is a matter of course that it is possible to use support members in which the first support members 21 and the second support 22 are integrally formed. As the second support members 22, also in the case that the tip portions of the pipes 3 are not projected from the open end portions of the ceramic batch supply holes 2 and are the same flat level as compared with the open end portions of the ceramic batch supply holes 2, if the tip portions of the pipes 3 are fixed in the same manner as mentioned above, it is a matter of course that the same effects of the second support members 22 can be obtained.

Figure 4A:
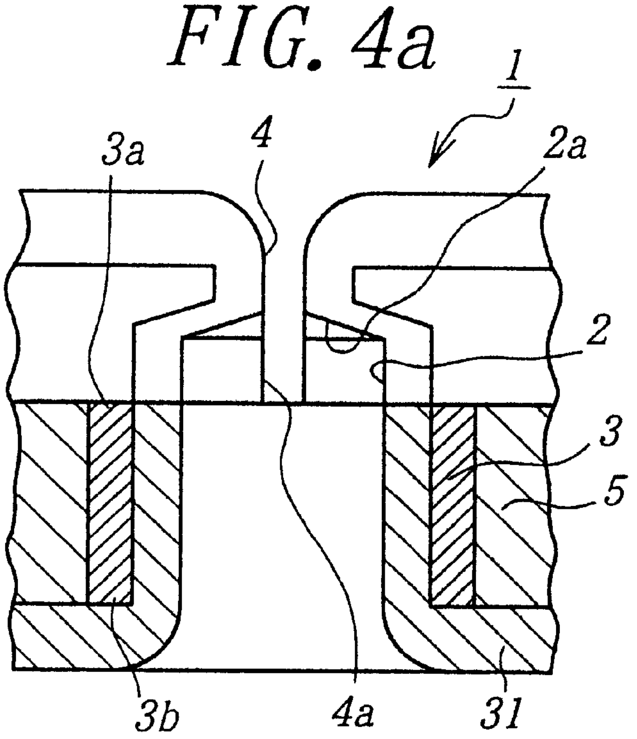
FIGS. 4*a* and 4*b* are schematic views respectively showing still another embodiment of a die for extruding ceramic honeycomb structural bodies according to the invention.
Figure 4B:
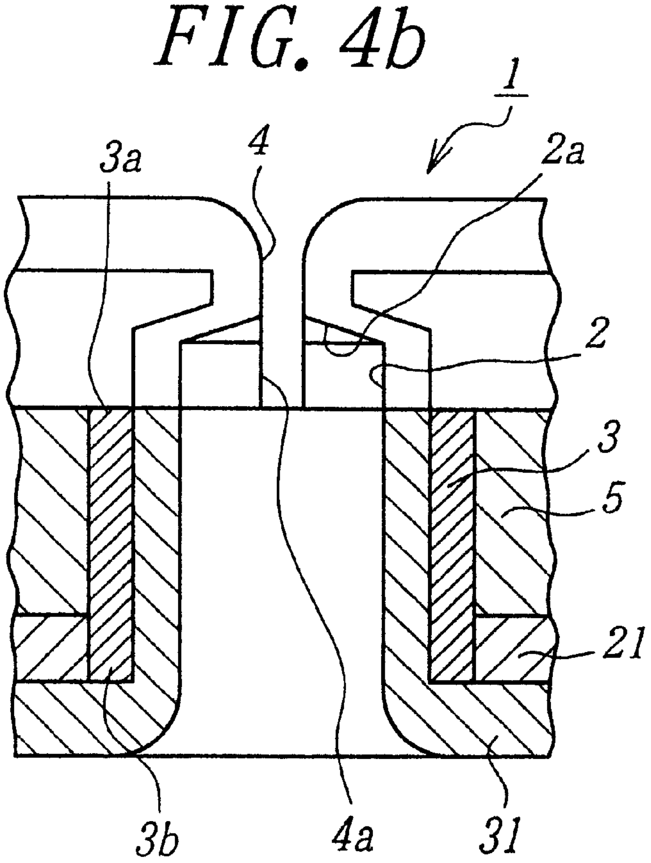
Figure 5:
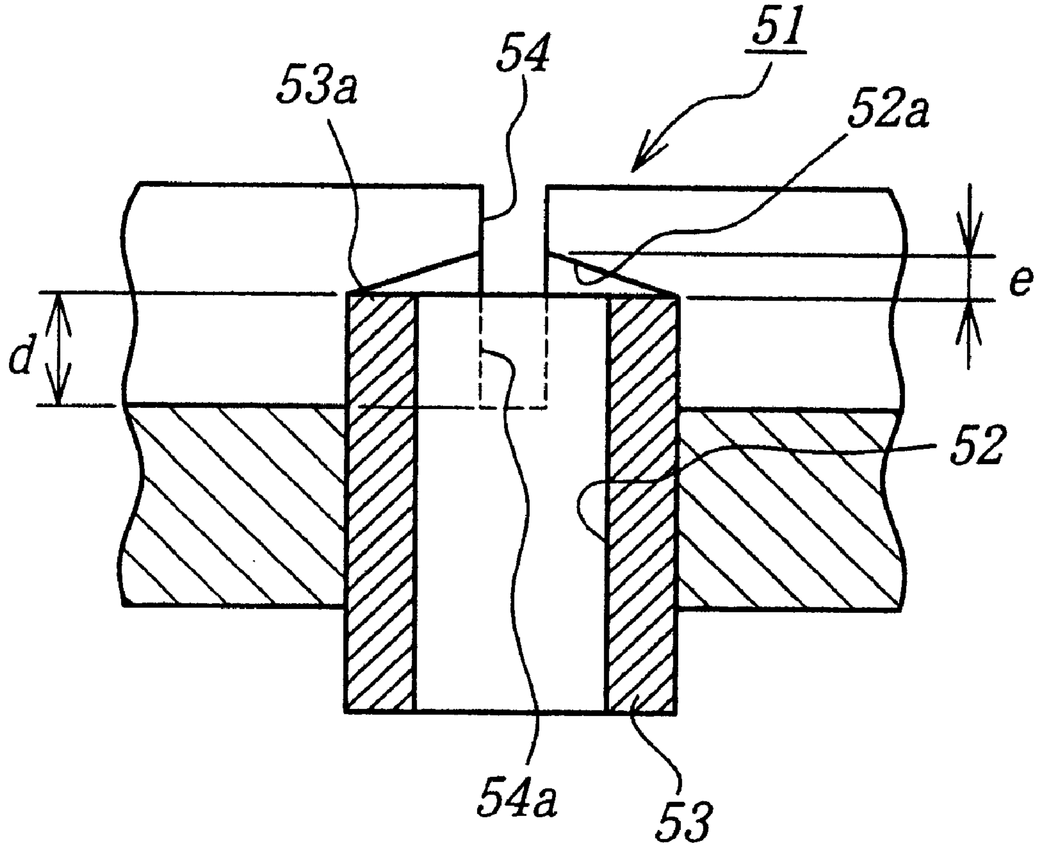
FIG. 5 PRIOR ART
FIG. 5 is a schematic view illustrating one embodiment of a known die for extruding ceramic honeycomb structural bodies.

FIGS. 4*a* and 4*b* are schematic views respectively showing still another embodiment of a die for extruding ceramic honeycomb structural bodies according to the invention. Also in the embodiments shown in FIGS. 4*a* and 4*b*, as is the same as the embodiments shown in FIGS. 1*a* and 1*b*, locations of the insert tip portions 3*a* of the pipes 3 correspond to locations of the tip portions 4*a* of the ceramic batch discharge slits 4, and the pipes 3 are accommodated in the pipe accommodation portions 11 arranged to inner surfaces of the ceramic batch supply holes 2. Moreover, in the embodiment shown in FIG. 4*b*, as shown in FIG. 3*a*, the pipes 3 are fixed to the ceramic batch supply holes 2 by using the support members 21. In the embodiments shown in FIGS. 4*a* and 4*b*, a different point as compared with the embodiments shown in FIGS. 1*a* and 1*b* or FIG. 3*a* is that surface coating portions 31 are arranged to the ceramic batch discharge slits 4 and the ceramic batch supply holes 2 under such a condition that the pipes 3 are fitted in the ceramic batch supply holes 2. If the surface coating portions 31 are formed in the manner mentioned above, it is possible to form an R portion to the ceramic batch discharge slits 4. The surface coating portions 31 can be formed by combining techniques such as CVD, electrolytic plating, electroless plating and so on.

An another producing method of the die 1 having the surface coating portions 31 is that surface coating portions 31 are arranged to exposed portions of respective ceramic batch discharge slits 4 and the ceramic batch supply holes 2 before the pipes 3 are inserted into the ceramic batch supply holes 2, and then the pipes are inserted into the ceramic batch supply holes 2 so as to locate the tip portions 3*a* of the pipes 3 apart from the bottom portions 2*a* of the ceramic batch supply holes 2.

As is clearly understood from the above explanations, according to the invention, the pipes are inserted in such a manner that the tip portions of the pipes are located apart from the bottom portions of the ceramic batch supply holes, and, preferably the locations of the tip portions of the pipes correspond to tip portions of the ceramic batch discharge slits. Therefore, it is possible to achieve a construction such that the tip portions of the pipes are not existent around at least a part of or all of the tip portions of the ceramic batch discharge slits, and a smooth ceramic batch supply from the ceramic batch supply holes to the ceramic batch discharge slits can be achieved, so that drawbacks of the pipes can be eliminated. Moreover, on the point of view of improving a die quality, it is effective to vary inner diameters of the pipes as the need arises.

What is claimed is:

1. A die for extruding ceramic honeycomb structural bodies, comprising a plurality of ceramic batch discharge slits on the front side of the die, a plurality of ceramic batch supply holes extending down from the back side of the die to a bottom portion thereof and being in fluid communication with said ceramic batch discharge slits, and a plurality of pipes fitted into at least some of said ceramic batch holes, wherein said pipes are inserted into said ceramic batch supply holes in such a manner that extending tip portions of said pipes are located apart from bottom portions of said ceramic batch supply holes.

2. The die for extruding ceramic honeycomb structural bodies according to claim 1, wherein locations of said tip portions correspond to tip portions of said ceramic batch discharge slits.

3. The die for extruding ceramic honeycomb structural bodies according to claim 1, wherein said pipes are arranged to inner surfaces of said ceramic batch supply holes.

4. The die for extruding ceramic honeycomb structural bodies according to claim 1, wherein said pipes have projection portions projected from open ends of said ceramic batch supply holes.

5. The die for extruding ceramic honeycomb structural bodies according to claim 1, wherein said pipes are fixed by second support members so as to prevent movements of said pipes toward open ends of said ceramic batch supply holes.

6. The die for extruding ceramic honeycomb structural bodies according to claim 1, wherein surface coating portions are applied to said ceramic batch discharge slits and said pipes are fitted in said ceramic batch supply holes.

7. The die for extruding ceramic honeycomb structural bodies according to claim 1, wherein surface coating portions are arranged to exposed portions of respective ceramic batch discharge slits and ceramic batch supply holes before said pipes are inserted into said ceramic batch supply holes, and then said pipes are inserted into said ceramic batch supply holes so as to locate tip portions of said pipes apart from bottom portions of said ceramic batch supply holes.

8. A die for extruding ceramic honeycomb structural bodies, comprising a plurality of ceramic batch discharge slits on the front side of the die, a plurality of ceramic batch supply holes extending down from the back side of the die to a bottom portion thereof and being in fluid communication with said ceramic batch discharge slits, a plurality of pipe accommodation portions having diameters larger than diameters of said ceramic batch supply holes arranged to inner surface of said ceramic batch supply holes, and a plurality of pipes fitted into at least some of said ceramic batch holes in said pipe accommodation portions, wherein said pipes are inserted into said ceramic batch supply holes in said pipe accommodation portions in such a manner that extending tip portions of said pipes are located apart from bottom portions of said ceramic batch supply holes.

9. A die for extruding ceramic honeycomb structural bodies, comprising a plurality of ceramic batch discharge slits on the front side of the die, a plurality of ceramic batch supply holes extending down from the back side of the die to a bottom portion thereof and being in fluid communication with said ceramic batch discharge slits, and a plurality of pipes fitted into at least some of said ceramic batch holes, wherein said pipes are inserted into said ceramic batch supply holes in such a manner that extending tip portions of said pipes are located apart from bottom portions of said ceramic batch supply holes, and said pipes have projection portions projected from open ends of said ceramic batch supply holes and wherein flanges are arranged integrally to said projection portions, thereby preventing movements of said pipes toward said bottom portions of said ceramic batch supply holes.

10. A die for extruding ceramic honeycomb structural bodies, comprising a plurality of ceramic batch discharge slits on the front side of the die, a plurality of ceramic batch supply holes extending down from the back side of the die to a bottom portion thereof and being in fluid communication with said ceramic batch discharge slits, and a plurality of pipes fitted into at least some of said ceramic batch holes, wherein said pipes are inserted into said ceramic batch supply holes in such a manner that extending tip portions of said pipes are located apart from bottom portions of said ceramic batch supply holes, and said pipes have projection portions projected from open ends of said ceramic batch supply holes with first support members are arranged to said projection portions so as to make said projection portions to a flat level.

11. The die for extruding ceramic honeycomb structural bodies according to claim 10, wherein said pipes and said first support members are fixed by second support members so as to prevent movements of said pipes toward open ends of said ceramic batch supply holes.

* * * * *